March 15, 1966     H. P. RAABE     3,241,140
METHOD AND MEANS FOR ELIMINATING RADAR RANGE AMBIGUITIES
Filed Sept. 21, 1962     4 Sheets-Sheet 1

INVENTOR.
HERBERT P. RAABE

BY
*Stuart R. Peterson*
ATTORNEY

March 15, 1966     H. P. RAABE     3,241,140
METHOD AND MEANS FOR ELIMINATING RADAR RANGE AMBIGUITIES
Filed Sept. 21, 1962     4 Sheets-Sheet 2
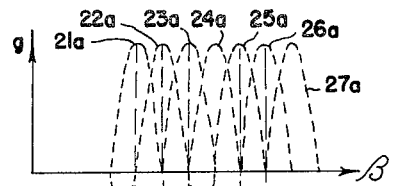
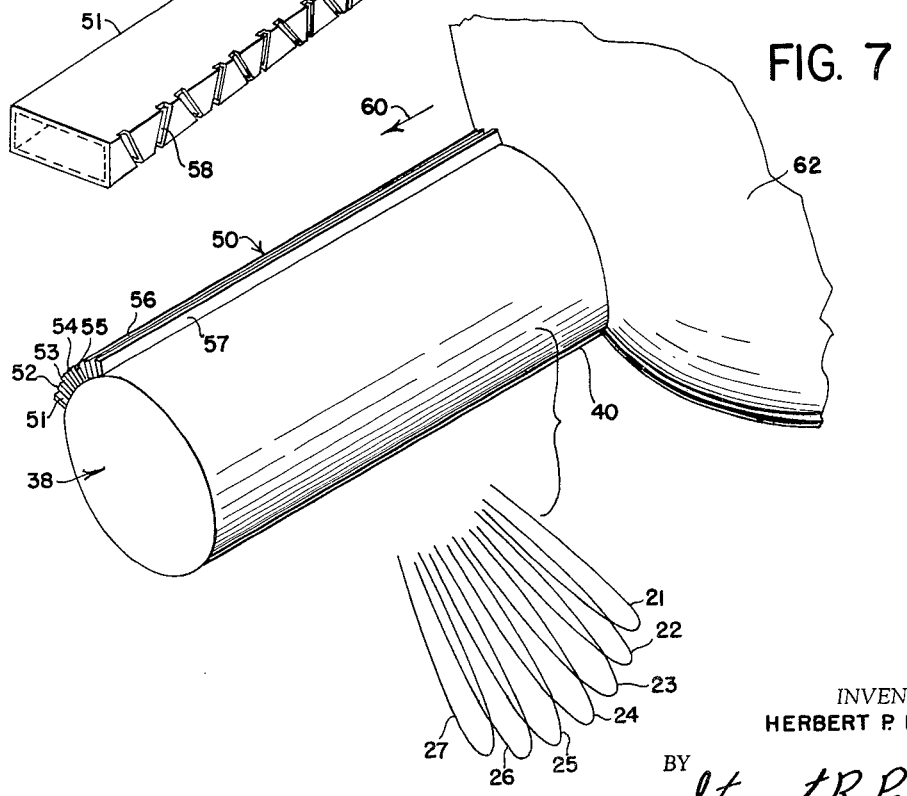
INVENTOR.
HERBERT P. RAABE
BY
*Stuart R. Peterson*
ATTORNEY INVENTOR.
HERBERT P. RAABE
BY Stuart R. Peterson
ATTORNEY March 15, 1966 H. P. RAABE 3,241,140
METHOD AND MEANS FOR ELIMINATING RADAR RANGE AMBIGUITIES
Filed Sept. 21, 1962 4 Sheets-Sheet 4
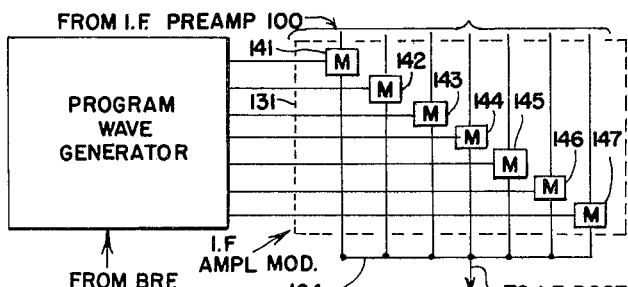
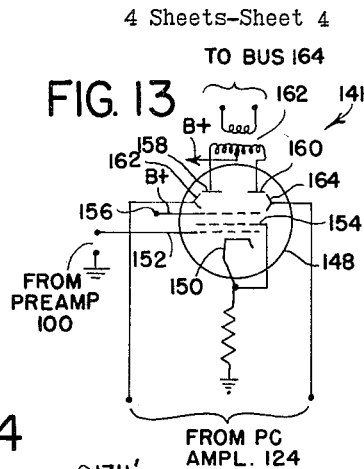
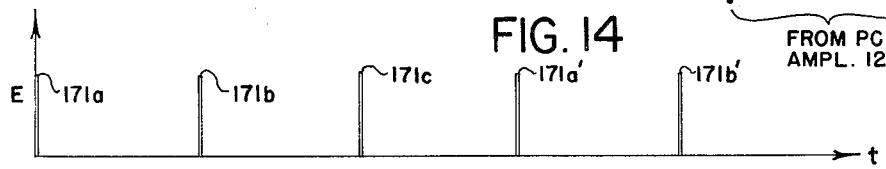
FIG. 14
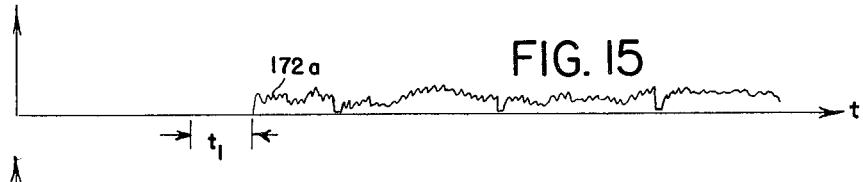
FIG. 15
FIG. 16
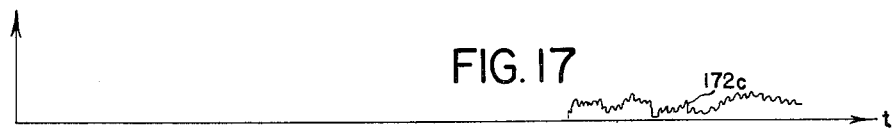
FIG. 17
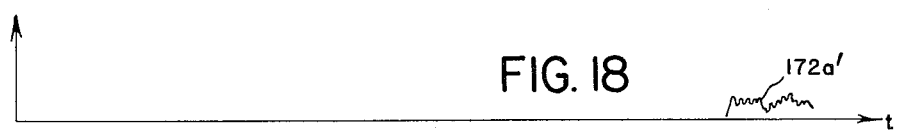
FIG. 18
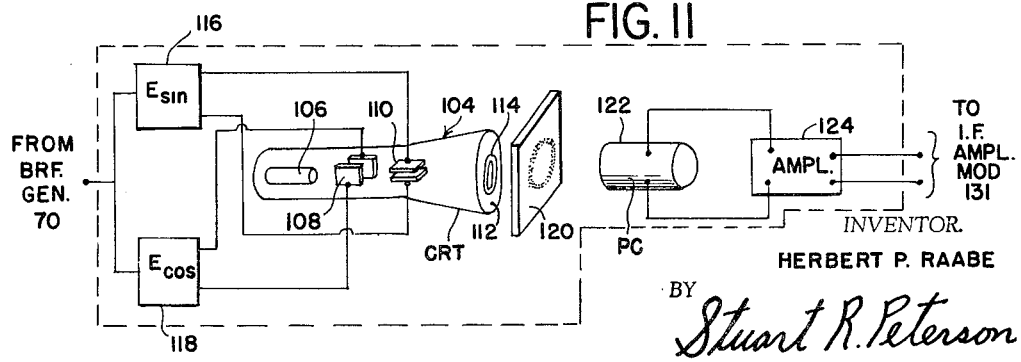
INVENTOR.
HERBERT P. RAABE
BY Stuart R. Peterson
ATTORNEY United States Patent Office 3,241,140
Patented Mar. 15, 1966

3,241,140
METHOD AND MEANS FOR ELIMINATING
RADAR RANGE AMBIGUITIES
Herbert P. Raabe, St. Paul, Minn., assignor, by mesne
assignments, to Litton Systems, Inc., Beverly Hills,
Calif., a corporation of Maryland
Filed Sept. 21, 1962, Ser. No. 225,235
10 Claims. (Cl. 343—13)

This invention relates generally to radar, and pertains more particularly to the elimination of range ambiguities in a coherent side looking radar system.

It is axiomatic that the maximum repetition rate of pulse radars is inversely proportioned to the maximum operational range. While range resolution determines the pulse duration only, azimuth resolution determines the antenna beamwidth, scanning speed and pulse repetition rate. With a given beamwidth consistent with the required resolution, an increased scanning speed requires an increased repetition rate in order to maintain continuity and performance. If the repetition rate is increased beyond the maximum rate determined by the maximum range, range ambiguities appear.

In order to eliminate these ambiguities, various schemes have been devised. They consist of pulse coding methods which permit the separation of simultaneous echoes from various ranges into individual channels which admit pulses of a particular code only. A simple and effective code is carrier frequency switching. This code has been employed in a fast scanning non-coherent radar with success.

For coherent radars the frequency code cannot be used because the phase history which is evaluated to obtain high resolution is constantly changing and is therefore different for pulses of different radio frequencies.

Other methods have been suggested but they all possess certain major disadvantages in that the time structures of their pulses are affected or altered.

One object of the present invention is to separate the desired echo from the undesired or ambiguous echoes appearing at different depression or elevation angles. More specifically, it is an aim of the invention to provide an antenna receiving pattern so configured that a high gain toward each desired echo is realized while at the same time causing a low or zero gain to be directed toward the undesired echoes.

Another object of the invention is to increase the sensitivity of the radar by means of very narrow beams directed toward the desired echoes, thereby reducing the amount of required power or producing a better signal-to-noise ratio. In other words, the invention makes it easier to meet specific performance requirements with less power.

Another object of the invention is to provide as many receiving patterns as there are ambiguous echoes, thereby rendering the invention highly reliable in practice as all ambiguities are properly taken care of.

A further object of the invention is to shift the antenna receiving pattern in such a manner that as the echo ranges increase and the angular elevations move up the desired echoes will be accurately tracked.

A still further object is to preserve the phase and amplitude characteristics of the received signals so that they can be properly processed at a high data rate and with high resolution.

Briefly, the invention envisages the use of a variable antenna receiving pattern comprised of a number of synthesized beams sufficient to sample the number of ambiguities to be expected for a desired set of radar parameters. These beams are swept at controlled rates by programming means so that the undesired ambiguities are reduced as indicated by the side lobe level. However, for maximum rejection, nodes in the resulting receiving pattern can be placed in such a way as to always track on the undesired ambiguities. In any event, as far as the desired echoes are concerned, a relatively high gain is directed at these echoes to produce recordable signals that can be interpreted either immediately or later on, as circumstances dictate.

These and other objects and advantages of my invention will more fully appear from the following description, made in connection with the accompanying drawings, wherein like reference characters refer to the same or similar parts throughout the several views and in which:

FIGURE 4 depicts a number of sample beams having their gain plotted against elevation angle;

FIGURE 5 represents a sweeping beam in the shape of a sinc beam, the sinc beam being derived by sampling the beams of FIGURE 4 at loci indicated by the various vertical lines;

Figure 9:
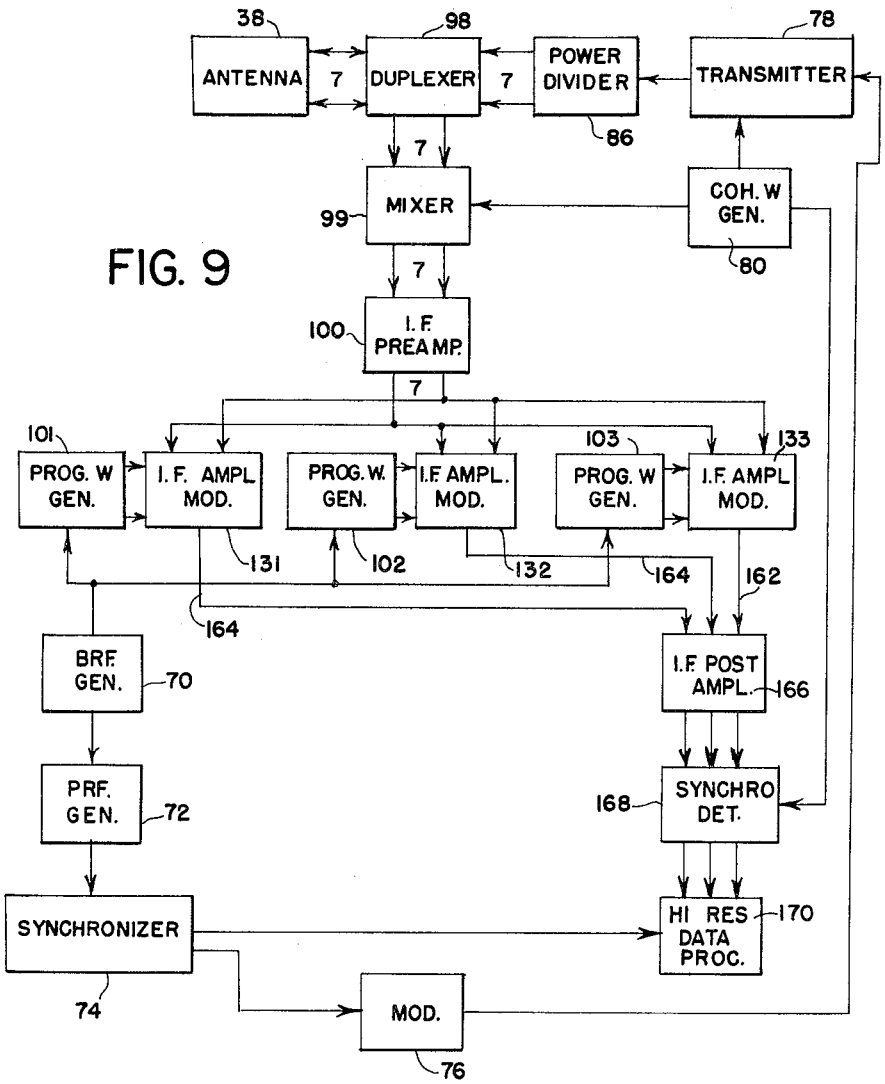
Figure 10:
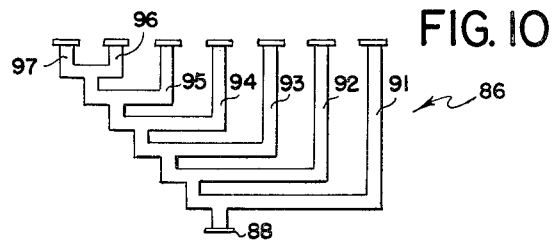

FIGURE 6 pictures four sample beams within the range of the main lobe and the first two side lobes of the beam of FIGURE 5;

FIGURE 7 is a perspective view of one form the antenna may assume in practicing my invention;

FIGURE 8 is a perspective view of one of the slotted waveguides employed in FIGURE 7;

FIGURE 9 is a block diagram of a complete radar system in accordance with the teachings of the invention;

FIGURE 10 is a diagrammatic view of the power divider utilized in FIGURE 9;

FIGURE 11 is a schematic diagram of one section of one of the program wave generators used in FIGURE 9;

FIGURE 12 depicts one of the program wave generators in block outline and one of the IF amplitude modulators in a subdivided block form;

FIGURE 13 is a schematic diagram of one of the modulators used in FIGURE 12;

FIGURE 14 shows a plurality of transmitted radar pulses versus time for one cycle of basic frequency, and FIGURES 15-18 illustrate various return signals produced by the transmitted pulses of FIGURE 14.

In order to understand how the instant invention will solve the problem of separating the ambiguous echoes from the desired ones, it will be of assistance to consider at the outset an illustrative case in which typical radar parameters have been chosen. The selected parameters may be as follows:

Radio frequency _____ $f_r$=10K mc./s.
Pulse length _____ $\tau_p$=0.2 μs.
Horizontal antenna aperture _____ $a$=9 feet.
Max. range _____ $R_{g0}$=50 nmi.
Vehicle velocity _____ $v$=20,000 feet/sec.
Altitude _____ $H_r$=100,00 feet.

The maximum slant range derived from the radar altitude and the maximum ground range becomes $$R_0 = \sqrt{R_{g0}^2 + H_r^2} = 52.7 \text{ nmi.}$$

The echo time over this range is $$t_e = \frac{2R_0}{c} = 650 \ \mu s.$$

with $c$=the velocity of light. The unambiguous maximum pulse repetition rate becomes $$f_u = \frac{1}{t_e} = 1540 \ c./s.$$

With a horizontal antenna aperture of 9 feet and a wave length of 3 cm., a beamwidth of 0.9 degree can be expected. At an angular deviation $\delta$ of 0.9 degree off the beam center the gain is sufficiently low, so that Doppler ambiguities caused by the pulse modulation will not cause interference. The Doppler frequency shift increases as the sine of the angular departure from the normal to the ground track. With proper alignment of the antenna, $\delta$ is identical to this departure; therefore, the Doppler shift $$f_d = \frac{2v}{c} f_r \sin \delta = 381,000 \delta$$

for small $\delta$ and becomes $f_d = 6360$ c./s. for $\delta = 0.9$ degree. The actual pulse repetition rate should be set equal to this Doppler shift in order to avoid Doppler or azimuth ambiguities.

The number of range ambiguities equals the ratio of the actual pulse repetition rate $f_d$ over the unambiguous maximum pulse repetition rate $f_d/f_u = 4.14$.

Figure 1:
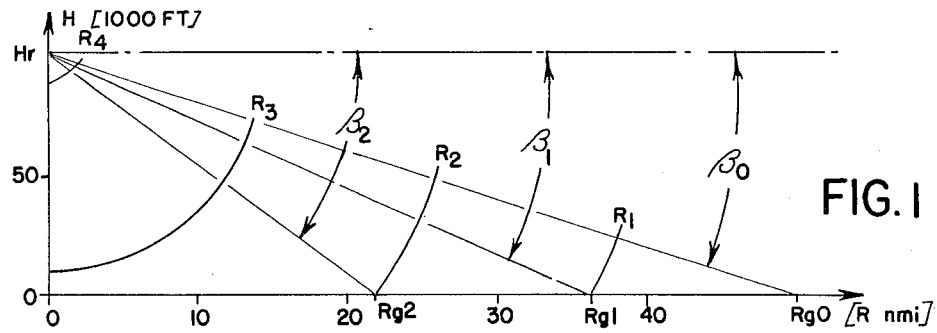
FIGURE 1 is a graphical representation of radar altitude against range for the purpose of explaining the presence of certain ambiguous zones for a given set of radar parameters.

One might expect that there would be always at least four ambiguities, and that during 14% of the time there would be even five. This is not so because of the high altitude of the radar. At least one, sometimes two, of the ambiguities fall within the minimum echo time due to the altitude signal. FIGURE 1 portrays this fact. It will be noted that altitude and range are drawn to the same scale in this figure. Accordingly, the ambiguous zones are shown as circles at uniform spacing. The radii of these circles are denoted by $R_0$ through $R_4$. The intersections of these circles on the ground are not uniform, quite obviously. When the last echo from the maximum range of 50 nmi. is received, ambiguities are present at $R_{g1} = 36$ nmi. and $R_{g2} = 22$ nmi. Two more ambiguous zones do not intersect the ground, these being the circles labeled $R_3$ and $R_4$.

While the depression angle for the maximum range is $\beta_0 = 18.2$ degrees, those of the ambiguities are $\beta_1 = 24.4$ and $\beta_2 = 37.2$ degrees. Therefore, the minimum angular distance between a desired and an undesired echo is $\beta_0 - \beta_1 = 6.2$ degrees. In order to provide an elevation pattern which has such a resolution, a vertical antenna aperture of 15 inches would be sufficient. As long as the nodes of the antenna pattern are placed fairly accurately on the undesired echoes, side lobe levels are of little concern.

In order to make full use of the possibilities of a variable receiving beam, the gain should be kept low over all elevation angles except for a pencil beam which tracks the desired echo. This method will also have the effect of reducing the amount of transmitted power that is required.

Under the assumed set of conditions, three sweeping beams are synthesized to provide the necessary range sampling. Each beam would start from about 10 nmi. and sweep out to 50 nmi., the maximum range that has been selected. The transmitting beam would be synthesized by the same antenna that will be referred to hereinafter. Duplexers would break into the receiving mode, thereby leaving traces parallel to the ground track similar to range marks at 19, 35 and 48 nmi.

Figure 2:
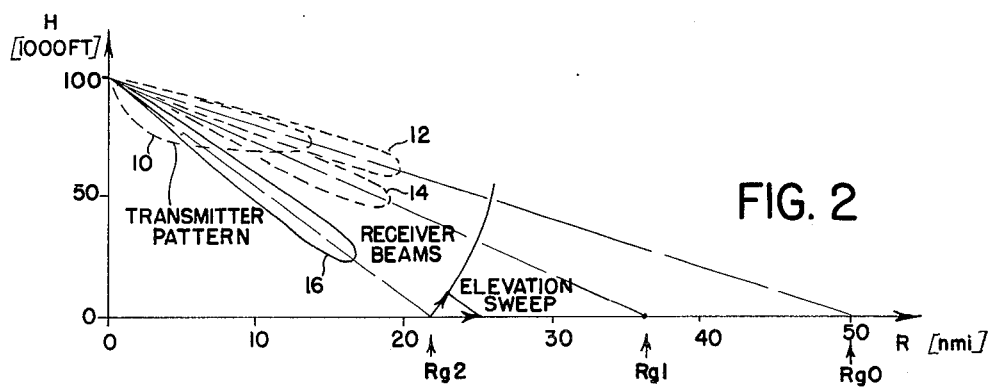
FIGURE 2 is a representation having the same polar coordinate scale of FIGURE 1 but showing both the transmission and receiving beam patterns with the latter being oriented so as to receive desired echoes from the ambiguous zones of FIGURE 1.

To avoid unduly overloading FIGURE 1 with lines, FIGURE 2 has been presented, the ordinates being the same in both views. In FIGURE 2 there appears a transmission pattern denoted by the reference numeral 10. The transmission pattern 10, it will be noted, gives the greatest emphasis to the most distant ranges and the taper toward the closer ranges is such that the echo, as received by a constant gain receiving beam, is practically independent of range.

Also pictured in FIGURE 2 are three receiving beams 12, 14 and 16 directed at the previously alluded to intersections $R_{g0}$, $R_{g1}$ and $R_{g2}$, respectively. It will be recalled, according to the assumed case, that there are up to three ambiguous range returns present at any one time; the beams 12, 14 and 16 are formed simultaneously to receive these echoes. The receiving characteristic formed by the beams 12–16 is sufficiently narrow that discrimination between simultaneously echoing patches is always possible, such patches being found at $R_{g0}$, $R_{g1}$ and $R_{g2}$ when the separation in elevation exemplified by the patches at $R_{g1}$ and $R_{g2}$ becomes a minimum.

Figure 3:
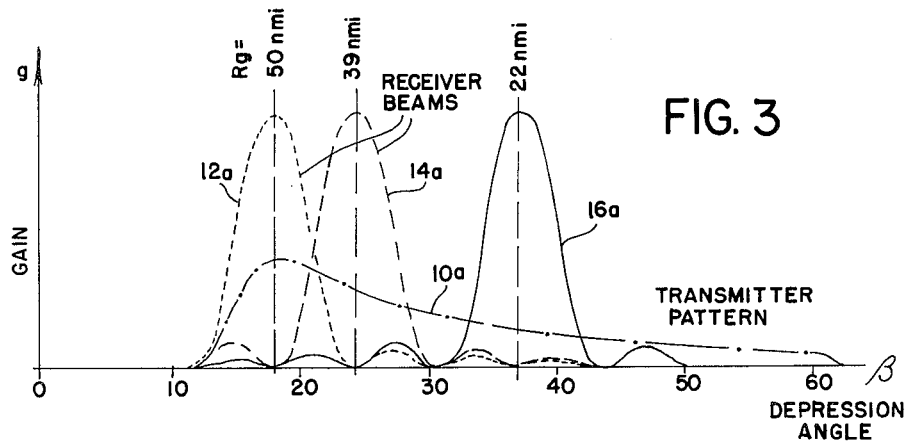
FIGURE 3 is a view corresponding to FIGURE 2 as far as content is concerned but with the gain of the transmitting and receiving patterns plotted on a Cartesian coordinate system.

The information portrayed in FIGURE 2 is pictured somewhat differently in FIGURE 3. In this figure the gain of the transmission and receiving patterns is plotted against the elevation angle. The patterns of FIGURE 3, due to their different ordinates, have been distinguished from those of FIGURE 2 by the suffix "a." It will be observed from FIGURE 3, though, that the toltal elevation sweep extends over 41 degrees. Because of this, up to seven sample beams are required for the beam synthesis.

As a prelude to a more detailed description of the seven sample beams mentioned above, it can be explained that the elevation sweep starts out at a very high speed at short ranges, diminishing rapidly toward long ranges. The mathematical derivation of this is as follows:

The slant range of any echo increases at one-half of the speed of light or $$r_s = v_s t = \frac{ct}{2} \qquad (1)$$

Hence, the ground speed or range sweep depends on the incident angle $\beta_i$ and becomes $$v_g = \frac{c}{2 \cos \beta_i} \qquad (2)$$

This results in an angular elevation sweep of $$\epsilon = \frac{c}{2R_s} \tan \beta_i \qquad (3)$$

If a flat earth is assumed, the incident angle equals the depression angle $\beta$ of the beam and one can set $$\tan \beta_i = \tan \beta = \frac{H_r}{R_g} \qquad (4)$$

where $H_r$ is the height of the antenna and $R_g$ the ground range. Thus, $$\epsilon = \frac{cH_r}{2R_s R_g} = \frac{cH_r}{2R_s \sqrt{R_s^2 + H_r^2}} \qquad (5)$$

Now (1) is introduced into (5) with the result that $$\epsilon = \frac{2H_r}{ct\sqrt{c^2 t^2 + 4H_r^2}} \qquad (6)$$

Thus, Equation 6 shows that the elevation sweep begins rapidly but slows down as it reaches the long ranges. In order to generate such fast-sweeping beams, no mechanically moving devices can be used. Instead, the beam must be swept electronically. One technique utilizes the sampling theorem. In such a technique, any function consisting of a time or spatial frequency spectrum with an upper frequency limit can be synthesized by a series of sinc functions $$\left( \text{where sinc } x = \frac{\sin x}{x} \right)$$

which are spaced at regular intervals of one half of the cycle of the limiting frequency whose amplitudes equal the value of the function at their position, and whose highest spectral component is that of the limiting frequency.

Attention is now directed for a moment to FIGURE 7 where seven such sample beams 21, 22, 23, 24, 25, 26 and 27 are illustrated on a polar coordinate basis. These same beams are also illustrated on a Cartesian basis in FIGURE 4 with the gain $g$ being the ordinate and the depression angle $\beta$ being the abscissa; the beams of FIGURE 4 bear the characters 21a, 22a, 23a, 24a, 25a, 26a and 27a, being distinguishable from the beams 21-27 of FIGURE 7 by the suffix "a." The beams 21-27 of FIGURE 7 or the beams 21a-27a of FIGURE 4, depending on which figure is being viewed, are normalized or unmodulated sample beams. For the sake of simplicity, the side lobes have been omitted in FIGURE 4 except for the second beam 22a, the two adjacent secondary lobes having in this instance been depicted for the purpose of making it plain that such lobes do exist.

It is readily apparent that a beam having the shape of a sinc beam, but in an arbitrary position, meets the requirements of a function that can be synthesized. As a theorem, it can be stated that a sinc beam can be synthesized by an infinite number of identical beams of proper amplitude adjustment but whose main beams are positioned at regular intervals equal to one-half the width of the main lobe measured at its base. Each sweeping beam, it should be pointed out, may be of the shape of a sinc beam and one such beam 16b has been illustrated in FIGURE 5, the samples having been taken at the places indicated by the vertical lines in accordance with the positions of the sample beams 21a-27a in compliance with the aforenoted theorem. It will be understood that the beam 16b may be any one of the beams 12, 14 or 16 of FIGURE 2, the last having been arbitrarily chosen. Within the range of the main lobe and the first two side lobes of the beam 16b, four amplitude adjusted sample beams 22b, 23b, 24b and 25b are defined; these beams are illustrated in FIGURE 6 while in theory, as already stated, an infinite series of sample beams are required to synthesize a sinc beam in an arbitrary position, a good approximation can be obtained with but a few beams in the vicinity of the main lobe and the beams 22b-25b constitute one example of such an approximation.

By moving a sinc beam along the axis, more spefically the beam 16b, in accordance with the speed defined in Equation 6, the amplitudes of the sample beams for any instant of time can be determined. Hence, the time variation of the amplitude of each sample beam can be derived.

Inasmuch as some variation of the shape of the sweeping beam 16b can be tolerated, it is possible to use sample beams of a slightly different configuration, since only a fairly uniform response to the desired echo is needed along with a sufficient rejection of the undesired ambiguities, the specific amplitude adjusted sample beams being such an approximation as already indicated.

It has been assumed that the rejection of the ambiguities as afforded by the side level of a sinc beam is sufficient. This may be true in most applications. However, if a stronger rejection is required, one could synthesize the beam in such a way as to place a null or zero gain point of the pattern on these ambiguities. Such nulls separate adjacent lobes of a pattern and by modification of the programming, nulls can be made to track the ambiguities. This case has been illustrated in FIGURE 2 where nulls of the side lobe patterns can always be found for two of the three beams where the third beam has its maximum gain.

Although various antenna designs are feasible, such as parabolic reflectors in combination with horns or linear arrays, a simple and practical antenna for the needed task is illustrated in FIGURE 7. This antenna, designated generally by the reference numeral 38, includes a cylindrical lens 40 known as a Luneberg lens. See, for instance, "The Mathematical Theory of Optics" by R. K. Luneberg, Brown University Press (1944). All that need be said about the construction of the lens 40 is that it is composed of a material or materials having different dielectric constants at its center and circumference with a generally uniform gardient therebetween. Preferably, the lens 40 should have a dielectric constant of 2.0 at its center and 1.0 at its periphery. Also, since certain radar parameters were earlier selected, the lens 40 should have a length of 9 feet and a diameter of approximately 2 feet.

It will be recalled that seven sample beams are to be produced, these having been shown as beams 21, 22, 23, 24, 25, 26 and 27 in FIGURE 7 (and 21a, 22a, 23a, 24a, 25a, 26a and 27a in FIGURE 4). A linear feed is needed for the production of each beam, so a set, collectively designated by the reference numeral 50, of appropriately configured waveguides is secured to the side of the lens 40 opposite to the side from which propagation is desired. These waveguides are individually identified by the reference numerals 51, 52, 53, 54, 55, 56 and 57. Because the manufacture of waveguides has become so commonplace, it is not thought necessary to describe the waveguides 51-57 in great detail. However, from FIGURE 8, it will be seen that the waveguide 51 there depicted possesses a rectangular cross section and the side adjacent the lens 40 is provided with spaced slots 58 oriented in the proper way to provide the required horizontal beam shape.

In a high resolution radar system of the envisaged character, the longitudinal axis of the Luneberg lens 40 would be parallel to the flight path, indicated by the arrow 60, of a space vehicle 62 which has been only fragmentarily depicted. The unmodulated sample beams labeled 21-27 in FIGURE 7 would, therefore, intercept the normal to the flight path over the entire operational range of the radar.

Having been apprised of the foregoing information, it is thought that the exemplary circuit shown in block form in FIGURE 9 will be more readily understood. While the transmission of radar pulses is generally conventional, it is to be observed that a basic repetition frequency (BRF) generator 70 is positioned in the circuit in advance of the pulse repetition frequency (PRF) generator 72. The BRF generator 70 generates a sine wave of one-third the pulse repetition rate frequency. The PRF generator 72 selects or derives the third harmonic from the signal produced by the BRF generator 70 to provide the desired pulse repetition rate. As is customary in the design of radar sets, the output from the PRF generator 72 is fed to a synchronizer 74 which is in turn connected to a modulator 76 for turning on and off a transmitter 78. Inasmuch as the present invention is concerned with a coherent radar system, a coherent wave generator 80 of high frequency stability furnishes phase reference for target returns during intervals between transmitter pulses. Stated somewhat differently, the oscillator or generator 80 compares the transmitted pulse and echoes in phase to the output of the generator and the frequency at which it operates would be governed by the speed of the space vehicle 62. Therefore, the generator 80 is connected to other circuitry to be described presently.

Since the power of each transmitted pulse from the transmitter 80 is to be divided into as many parts as there are sample beams and since seven such sample beams have been assumed in the example, the transmitted pulse is to be divided into seven portions. To do this, we deviate from what is usually provided in a radar system and employ a simple power divider 86 consisting of the waveguide assembly diagrammatically shown in FIGURE 10. The inlet at 88 is coupled to the output from the transmitter 78 and because seven sample beams produce the pattern 10 in FIGURE 2, it follows that seven branches or arms 91, 92, 93, 94, 95, 96 and 97 are needed, the output ends of these arms being in turn coupled to the waveguides 51, 52, 53, 54, 55, 56 and 57, respectively, of the antenna 38 through a seven channel duplexer 98, which for the sake of discussion may be considered to be seven separate and distinct duplexers of conventional design, each having a T-R tube therein.

The reflected signals picked up by the antenna 38 are fed via the receiver terminals of the duplexer 98 to a seven channel mixer 99 which is tied to the coherent wave generator 80 for phase referencing purposes as hereinbefore mentioned. The output from the seven channel mixer 99 is fed to a seven channel IF preamplifier 100, here again to be considered as merely seven such amplifiers each having a sufficient number of stages therein in order to provide usable return signals of sufficient amplitude.

At this point, it will be well to leave the return signals for a moment in order to consider the manner in which these signals are processed within the system of FIGURE 9. Accordingly, it will be noted that the BRF generator 70 in addition to being connected to the PRF generator 72 is connected to three program wave generators 101, 102 and 103 of identical construction, each containing seven channels, which generate sinc signals capable of producing the swept received beams 12, 14 and 16. In other words, the program wave generators 101–103 generate signals which result in the synthesized beam 16b of FIGURE 5. The program wave generators 101–103 may vary as to their construction. For instance, harmonic wave synthesis can be employed in which the harmonics are derived by filtering; magnetic discs can be employed having the proper waveform signals contained thereon, or electronic storage tubes using a modified target plate on which the waveform signals are stored can be employed. For the sake of ready understanding, though, a cathode ray tube system has been selected and the means constituting one channel is illustrated in FIGURE 11. The cathode ray tube (CRT) has been designated generally by the reference numeral 104 comprising the usual electron beam gun 106, horizontal deflecting plates 108, vertical deflecting plates 110 and screen 112. The electron beam impinging on the screen is intended to follow a circular path and is defocused sufficiently so as to produce a ring-like pattern 114. A sine wave generator 116 and a cosine wave generator 118 coact to supply the appropriate deflecting voltages to achieve this circular beam configuration, these generators 116, 118 being tied to the BRF generator 70 so as to cause the electron beam to make a complete circle at one-third the pulse repetition frequency rate provided by the PRF generator 72. A mask 120 is placed in front of the screen 112 having a density or opacity pattern varying in accordance with a periodical waveform that in turn varies in a fashion such as to provide a modulating signal that is used in a manner soon to be described. In other words, a set of seven masks would be utilized in each program wave generator 101, 102, 103, the masks for corresponding channels being identical but rotated through different angles for each of the program wave generators 101–103. A photocell pickup 122 is disposed at the other side of the mask 120 from the cathode ray tube 104 so as to sense the light changes and convert them to electrical signals. These electrical signals are amplified by an amplifier 124 to produce a modulating signal for one of the channels such as the channel that includes the waveguide 51. Since there are seven channels to be serviced, there are seven cathode ray tubes 104 in the generator 101, which in conjunction with seven masks 120 collectively provide the modulating signals that produce the beam 16b of FIGURE 5 (which is the beam 16 of FIGURE 2). The program wave generators 102 and 103 can be considered to produce the beams 14 and 12, respectively, as will be better understood from the description below.

The control signals from the three program wave generators 101, 102, 103 are impressed on three IF amplitude modulators 131, 132, 133, respectively. Here again, each modulator 131 is really a bank of seven individual modulators, one for each channel. Because the outputs of the individual modulators, designated by the reference numerals 141, 142, 143, 144, 145, 146, 147 are tied together, it is thought best to present FIGURE 12 showing the program wave generator 101 with its seven outputs from the amplifiers 124, one of which appears in FIGURE 11.

One of these modulators, the modulator 141, is detailed in FIGURE 13. Actually, such a modulator may be based on a vacuum tube or a solid state device. However, special vacuum tubes are available which are particularly suited for multiplying two time variables together. Therefore, the circuit of FIGURE 13 includes a tube 148, such as a 6AR8 tube, having a cathode 150. The electron current emitted from the cathode 150 is first modulated by a grid 152 connected to the output from IF preamplifier 100, more specifically from the particular preamplifier concerned with the channel to be modulated by the specific modulator 141 of FIGURE 12. The current passes between two auxiliary grids 154, 156 and then advances toward two plates 158, 160. Two electrodes 162, 164 are arranged in such a way that the electron current can be deflected to one plate 158 or the other plate 160. Such action results in unbalanced currents in a transformer 162 constituting the output for the individual modulator 141.

The outputs of the various modulators 141–147 are joined together by a bus 164, as shown in FIGURE 12. There will, of course, be a bus 164 for each IF amplitude modulator 131–133, these buses also appearing in FIGURE 9. It will be appreciated that the IF amplitude modulators 131–133 provide the receiving beam patterns 12–16 shown in FIGURE 2.

The outputs from the IF amplitude modulators 131–133 are fed to an IF post amplifier 166 shown in the block diagram of FIGURE 9, actually three individual amplifiers. The amplified modulated signal is then demodulated by a synchronous detector 168 which is phase controlled by the earlier-mentioned coherent wave generator 80. The detector or video outputs are then processed according to the state of the art by a high resolution data processor 170 for producing the appropriate signals for storage purposes, map drawing purposes and the like.

With respect to a brief operational sequence, reference will be made to FIGURES 14–18 which are representative of transmitted and received signals having their amplitudes plotted against time. In order to reference the received signals of FIGURES 15–18 with respect to the transmitted pulses of FIGURE 14, appropriate suffixes have been employed. Accordingly, the first transmitted pulse has been labeled 171a, the second 171b, the third 171c, the fourth 171a', and the fifth 171b'. Naturally, there exists a considerable lapse of time before the first echo from transmitted pulse 171a appears; this received signal has been given the reference numeral 172a in FIGURE 15. Close comparison of FIGURE 15 with FIGURE 14 will reveal that the signal 172a does not arrive at the antenna 38 until after the second pulse 171b has been transmitted. The interval between the trailing edge of the pulse 171b and the start of the return 172a has been denoted $t_1$. Thus, we get a continuous function represented by the signal 172a over the entire operational range which has been considered to be 50 nmi. The return 172a is, however, terminated shortly after the fifth pulse 171b' is transmitted, at least to an extent that it is too weak to be usable. While wider in time, relatively speaking, than would occur in actual practice, gaps are produced in the received signal 172a (and the received signals 172b, 172c, 172a' of FIGURES 16–18) by reason of the breaking into the receiving mode by the duplexer 98 in order to permit transmission of the pulses 171c, 171a' and 171b', such action being conventional in radar operations.

From the graphical information presented in FIGURES 14 and 15, it can be appreciated that where the return comes from can be seen at any given time. For instance, when pulse 171c is transmitted, the echo comes from an arc intersecting the horizontal range line of FIGURE 1 at 19 nmi.

Consequently, the synthesized beam 16b of FIGURE 5 can be deemed the one moving with the return 172a through the entire elevation angle or range of the return 172a. In other words, as the depression or elevation angle changes from $\beta_2$ to $\beta_0$ in FIGURE 1, the beam 16b is moved through this angle, too. It will be recalled that the beam 16b represents the receiving beam 16 of FIGURE 2, although similar beams 16b are swept for the purpose of providing the beams 12 and 14.

Because the beam 16b of FIGURE 5 representing the beam 16 of FIGURE 2 is swept through the depression angle $\beta_2 - \beta_0$ in a manner programmed by the generator 101, it is always looking in a direction to see desired echoes and never undesired ones, this being because there is a high gain in the direction of the desired return.

If the beam 16 is regarded as the first sweeping beam, then the beam 12 of FIGURE 2 would follow, and the beam 14 would follow the beam 12 as far as the sweeping order is concerned. Once again, though, it should be borne in mind that beam 16b is representative of each beam 12-16, these beams 12-16 being controlled by the program wave generators 101-103 by reason of the angular displacement of the masks 120, one of which masks is shown in FIGURE 11. Thus, one such synthesized beam 16b moves with the return 172a derived from the transmitted pulse 171, another beam 16b moves with the return 172b from the pulse 171b, and another beam 16b moves with the return 172c from the pulse 171c. The need for three such beams 16b is, of course, the reason for the three program wave generators 101-103. When the first of these beams 16b, designated as 16 in FIGURE 2, has completed its job of tracking by moving into the $\beta_0$ angular position, it is switched back to its lowest depression angle $\beta_2$ and starts over, producing the return labeled 172a' of FIGURE 18 this time that is derived from the transmitted pulse 171a'. This action is sequentially represented as the vehicle 62 moves through space in the direction of the arrow 60. The detector or video signals are processed by the data processor 170 according to the use to be made of the derived data.

It will, of course, be understood that various changes may be made in the form, details, arrangements and proportions of the parts without departing from the scope of my invention as set forth in the appended claims.

What is claimed:
1. A method of echo ranging comprising the steps of:
    transmitting radar pulses at a repetition rate sufficient to produce both unambiguous and ambiguous echoes,
    providing a series of separate and distinct receiving beams directed toward successive elevation angles for receiving said unambiguous and ambiguous echoes, and
    tracking only the unambiguous echoes by successively selecting the echoes appearing in successive ones of said receiving beams.
2. In a radar system:
    means for transmitting pulses at a repetition rate greater than the unambiguous maximum pulse rate for a given range to produce ambiguous echoes,
    means for receiving echoes from a plurality of directions to produce a return signal for each echo,
    means responsive to each of said return signals for generating a modulating signal, and
    means for controlling the amplitude of each modulating signal according to a prescribed program to produce a sweep beam for tracking only a desired one of said ambiguous echoes.
3. In a side looking radar system:
    means for transmitting radar pulses at a pulse repetition frequency sufficient to produce both unambiguous and ambiguous echoes,
    a power divider coupled to said transmitting means for dividing each transmitted pulse into a predetermined number of portions,
    duplexing means having a channel for each of said portions connected to said power divider,
    antenna means connected to said duplexing means, said antenna means being provided with a plurality of radiating elements equal in number to the number of said channels,
    mixing means connected to said duplexing means for providing an intermediate frequency signal from each channel, and
    means for combining predetermined portions of said intermediate frequency signals from said channels to provide an output signal, said combining means being effective to successively vary said predetermined portion for each of said channels for rendering said output signal indicative of said unambiguous echo.
4. A radar system in accordance with claim 3 in which said combining means includes:
    a cathode ray tube for each channel, said cathode ray tube having a light beam following a selected path;
    a variable density mask for each cathode ray tube having a density pattern varying according to a predetermined program for passing selected amounts of said light beam as said light beam follows said selected path;
    photoelectric pickup means for sensing the light passing through said mask to provide a modulating signal;
    multiplying means for each channel, said multiplying means being responsive to both said intermediate frequency signal and said modulating signal corresponding to each channel for producing individual output signals varying according to said modulating signal, and
    means for adding said individual output signals to provide a system output signal indicative of said unambiguous echo.
5. A method of echo ranging comprising the steps of:
    transmitting a series of radar pulses at a relatively high repetition rate from above the earth's surface, each radar pulse of said series intercepting successive points on the earth's surface at a rate varying with the range of said successive points to produce an echo, said high repetition rate causing said echoes to be ambiguous with respect to the range of said intercepted points on the earth's surface;
    providing a series of directional receiving patterns for response to echoes from radar pulses intercepting successive ones of said points having successively varying ranges;
    producing for each of said receiving patterns a program indicative of the moment at which the echo response appearing in said receiving pattern is to be sampled, said programs as a group indicating that substantially only one of said patterns is to be sampled during a given moment and that said patterns are to be sampled in succession; and
    sampling said echo responses appearing in each of said receiving patterns according to said corresponding program so that said echo responses appearing in successive receiving patterns are indicative of a desired echo.
6. In a radar system:
    means for transmitting radar pulses at a repetition rate greater than the unambiguous maximum pulse rate for a given range so that desired echoes and undesired echoes are produced;

antenna means including a plurality of directional antennas, each of said antennas being receptive to an echo from a given elevation angle for generating a separate return signal;

means responsive to said return signals for indicating the range of the echo corresponding to each of said return signals; and means operating according to a predetermined program for passing said return signals from successive ones of said antennas to said indicating means so that the ranges of only said desired echoes are indicated.

7. A radar system which comprises:

means for transmitting radar pulses at a repetition rate greater than the unambiguous maximum pulse rate for a given range, said pulses producing echoes from points on the earth's surface at various elevational directions from said transmitting means;

antenna means having a receiving beam directed at each direction of a selected group of said various elevational directions;

output channel means corresponding to each of said receiving beams, each of said channel means being responsive to an echo appearing in the corresponding receiving beam for generating a return signal;

program means corresponding to each output channel means for producing a program signal varying according to a periodic waveform, said program signals being produced in out of-phase relationship so that said predetermined program signals attain a selected value in succession; and individual means for each corresponding output channel means and program means, said individual means being conditioned in succession by said program signals successively attaining said selected value and being modulated by said return signals for generating an output signal indicative of a given radar pulse echoing from successive points on the earth's surface.

8. In a side looking radar system including means for producing radar pulses of a rate sufficient to cause unambiguous and ambiguous echoes; a transmitter for transmitting said pulses; a power divided coupled to said transmitter for dividing said transmitted pulses into a predetermined number of parts; and antenna means including a linear feed for propagating each pulse part in a selected direction so that said pulse parts form a transmitted beam, each of said linear feeds being receptive to an echo resulting from one of said pulse parts; the improvement which comprises:

means responsive to said received echoes for producing a modulating signal representative of each of said received echoes;

means for generating a periodic program signal for each of said modulating signals, said periodic program signals attaining a selected value in succession; and means for multiplying corresponding program and modulating signals to generate output signals, successive output signals resulting from program signals having said selected value being indicative of an unambiguous echo resulting from said pulse parts.

9. A radar system for tracking a given echo while minimizing the effect of echoes simultaneous therewith which tend to render said given echo ambiguous, which comprises:

means for transmitting radar pulses at a repetition rate greater than the unambiguous maximum pulse rate for a given range;

antenna means for producing a receiving beam for each of a selected number of elevation angles;

individual amplifier means having a channel corresponding to each receiving beam for generating a modulating signal indicative of a return signal appearing in said receiving beam;

program means for producing a control signal corresponding to each of said channels, said program means being effective at given selecting moments to produce for a first of said channels a maximum amplitude control signal and to produce for the remainder of said channels minimum amplitude control signals;

individual multiplying means for each of said channels, one of said multiplying means being effective to multiply said maximum amplitude control signal of said first channel and a modulating signal of said first channel for generating a first output signal having a maximum amplitude and being substantially representative of an echo appearing in a selected receiving beam corresponding to said first channel, the remainder of said multiplying means being responsive to said minimum amplitude control signals and said modulating signals of said other channels for producing a series of second output signals each having a minimum amplitude for substantially attenuating the echoes appearing in said beams other than said selected receiving beam; and means for rendering said program means effective to apply said maximum amplitude control signals to successive multiplying means so that said given echo is tracked and the effect of said simultaneous echoes is minimized.

10. A radar system according to claim 9, wherein:

said program means comprises a signal generator for each of said channels, each of said signal generators being effective to generate a periodic control signal which is out of phase with the control signals of the other channels; and each of said multiplying means including electronic means for generating an electron current modulated by the modulating signal of one of the channels and applied to an output electrode according to the amplitude of one of the control signals to produce the first output signal having the maximum amplitude when said control signal equals said maximum amplitude.

References Cited by the Examiner

UNITED STATES PATENTS

| | | | |
|---|---|---|---|
| 2,688,744 | 9/1954 | Sunstein | 343—16 |
| 2,817,832 | 12/1957 | Mathes | 343—13 |
| 3,064,252 | 11/1962 | Varela | 343—16.1 |
| 3,113,310 | 12/1963 | Standing | 343—16 |

CHESTER L. JUSTUS, *Primary Examiner.*